United States Patent
Peng et al.

(10) Patent No.: US 12,175,584 B2
(45) Date of Patent: Dec. 24, 2024

(54) METHOD AND APPARATUS FOR ANIMATION RENDERING, ELECTRONIC DEVICE, AND STORAGE MEDIUM

(71) Applicant: Beijing Elex Technology Co., Ltd, Beijing (CN)

(72) Inventors: Tong Peng, Beijing (CN); Minnan Chen, Beijing (CN)

(73) Assignee: Beijing Elex Technology Co., Ltd, Beijing (CN)

( * ) Notice: Subject to any disclaimer, the term of this patent is extended or adjusted under 35 U.S.C. 154(b) by 328 days.

(21) Appl. No.: 17/945,996

(22) Filed: Sep. 15, 2022

(65) Prior Publication Data

US 2023/0316624 A1    Oct. 5, 2023

(30) Foreign Application Priority Data

Mar. 31, 2022   (CN) .......................... 202210342235.3

(51) Int. Cl.
*G06T 13/80* (2011.01)
*G06T 9/00* (2006.01)
*G06T 11/00* (2006.01)

(52) U.S. Cl.
CPC ............. *G06T 13/80* (2013.01); *G06T 9/00* (2013.01); *G06T 11/001* (2013.01)

(58) Field of Classification Search
CPC .......... G06T 13/80; G06T 9/00; G06T 11/001
USPC ......................................................... 345/583
See application file for complete search history.

(56) References Cited

U.S. PATENT DOCUMENTS

2016/0247308 A1* 8/2016 Jiao ..................... G06T 15/503
2018/0082460 A1* 3/2018 Xing ...................... G06T 13/80
2018/0308276 A1* 10/2018 Cohen ................. G06T 15/205
2021/0019929 A1   1/2021 Nemchinov et al.
2023/0298252 A1* 9/2023 Xiao ......................... G06T 7/75
                                                              345/418

FOREIGN PATENT DOCUMENTS

JP         2011227908 A      11/2011
JP         2020022673 A       2/2020

OTHER PUBLICATIONS

Japanese Office Action for Application No. 2022-157691, mailed Nov. 7, 2023 (13 pages).
Proxy-Geometry-Gem-Rendering.
Fast,Progressive-Loading-of-Binary-Encoded-Declarative-3D-Web-Content.
Texture-Animation: Applying-Morphing- and-Vertex-Animation-Techniques.
Extended European Search Report for EP Application No. 22197372.0, dated Oct. 2, 2023,.

* cited by examiner

*Primary Examiner* — Thomas J Lett
(74) *Attorney, Agent, or Firm* — W&G Law Group

(57) ABSTRACT

Provided is a method and apparatus for animation rendering, an electronic device, and a storage medium. The method for animation rendering includes: in a vertex animation mode, acquiring vertex position information and normal information from a same first texture file, wherein the vertex position information occupies a part of an R channel, a part of a G channel and a part of a B channel, and the normal information occupies another part of the R channel, another part of the G channel, another part of the B channel, and an A channel; and performing animation rendering according to the vertex position information and the normal information.

18 Claims, 4 Drawing Sheets

METHOD AND APPARATUS FOR ANIMATION RENDERING, ELECTRONIC DEVICE, AND STORAGE MEDIUM

CROSS-REFERENCE TO RELATED APPLICATIONS

The present application claims priority to Chinese Patent Application No. 202210342235.3, filed on Mar. 31, 2022, the content of which is incorporated herein by reference in its entirety.

TECHNICAL FIELD

The present disclosure relates to the field of animation technologies and, in particular, to a method and apparatus for animation rendering, an electronic device, and a storage medium.

BACKGROUND

As game progress, the more objects are rendered in the game, the better the effect of the game is. For example, large-scale soldier marches and battles are an indispensable part of simulation game (SLG). Currently, games generally use the Graphics Processing Unit (GPU) and skin instance method to achieve rendering of a large number of soldiers, which reduces Drawcall and thus improves the game efficiency. GPU Skin Instance is a method of rendering multiple skin meshes in one Drawcall through the instance rendering ability of the GPU. The premise of instance rendering is that all skin meshes use the same resources, including material parameters and skeleton animation data. Conventional animation data is set object by object. Before rendering each skin mesh, the skeleton animation is updated and transferred to a constant buffer for using by GPU skin. Therefore, in order to realize the Skin Instance of the skin mesh, the animation data needs to be packaged into one resource, and an appropriate method is to store the animation data into textures. When performing animation rendering, the animation data is obtained by sampling the textures and is then rendered. However, the current storing technology of animation data through texture has low efficiency.

SUMMARY

Embodiments of the present disclosure provide a method and apparatus for animation rendering, an electronic device, and a storage medium, which can improve the efficiency of storing animation data through texture.

In a first aspect, provided is a method for animation rendering. The method includes: in a vertex animation mode, acquiring vertex position information and normal information from a same first texture file, the vertex position information occupies a part of an R channel, a part of a G channel and a part of a B channel, and the normal information occupies another part of the R channel, another part of the G channel, another part of the B channel, and an A channel; and performing animation rendering according to the vertex position information and the normal information.

In one or more embodiments, the first texture file is in an RGBAHalf format, the vertex position information occupies 8 bits in a decimal place of each of the R channel, the G channel and the B channel, and the normal information occupies 2 bits in a decimal place of each of the R channel, the G channel, the B channel and 16 bits of the A channel.

In one or more embodiments, the acquiring the vertex position information and normal information from a same first texture file includes: sampling the first texture file in a shader and obtaining first raw data; and decoding the first raw data and obtaining the vertex position information and normal information.

In one or more embodiments, the method for animation rendering further includes: in a skeleton animation mode, acquiring motion data form a second texture file, the motion data includes translation data and rotation data of quaternion; and performing animation rendering according to the motion data.

In one or more embodiments, the motion data further includes scaling data.

In one or more embodiments, the acquiring motion data from the second texture file includes: sampling the second texture file in a shader and obtaining second raw data; and decoding the second raw data and obtaining the translation data, the rotation data, and the scaling data.

In a second aspect, provided is an apparatus for animation rendering including an acquiring module and a rending module. The acquiring module is configured to acquire vertex position information and normal information from a same first texture file in a vertex animation mode, the vertex position information occupies a part of an R channel, a part of a G channel and a part of a B channel, and the normal information occupies another part of the R channel, another part of the G channel, another part of the B channel, and an A channel. The rending module is configured to perform animation rendering according to the vertex position information and the normal information.

In a third aspect, provided is an electronic device including at least one processor; and a memory coupled to the at least one processor and storing programmable instructions. When executed by the at least one processor, the programmable instructions cause the at least one processor to perform the method for animation rendering described as above.

In a fourth aspect, provided is a non-transitory storage medium storing programs stored thereon. When being executed, the programs cause a device where the non-transitory storage medium is located to perform the method for animation rendering described as above.

In a fifth aspect, provided is a computer program product including executable instructions. When executed by a computer, the executable instructions cause the computer to perform the method for animation rendering described as above.

Embodiments of the present disclosure provide a method and apparatus for animation rendering, an electronic device, a storage medium, and a computer program product. The vertex position information and the normal information each occupies a part of each RGB channel in a texture file, and the normal information further occupies the A channel. In this way, the vertex position information and the normal information can be together stored in a same texture file. In this way, in the animation rendering, two types of information, the vertex position information and the normal information, can be obtained by sampling just one texture file, which is convenient for animation rendering and saves the number of sampling times in the rendering process, and thus the efficiency of storing animation data through textures is improved.

DESCRIPTION OF EMBODIMENTS

Terms used in the embodiments of the present disclosure are only for the purpose of describing specific embodiments, but not intended to limit the present disclosure.

Before describing the embodiments of the present disclosure, problems in the related art are first described. There are two animation modes for the Skin Instance method: vertex animation mode and skeleton animation mode. The technical problems in the two modes are described below.

In the vertex animation mode, each frame of animation data is soft skinned to the mesh data, the mesh vertex position information is directly obtained from the memory, and for each vertex position information, its corresponding normal information also needs to be obtained. Accordingly, two textures are required, for example, one texture in an RGBAHalf format, which is used for storing vertex position information; and the other texture in an RGB24 format, which is used for storing normal. When rendering, an animation state of a rendering instance is updated in a script, uv coordinates in the texture is calculated according to a key frame and a vertex index played in the current animation, and then the vertex position information and normal information are obtained.

In the vertex animation mode, rendering of an object needs to sample the texture that stores the vertex position information and the texture that stores the normal information. That is, two times of samplings are required, and the number of sampling times is doubled due to motion fusion, that means the total number of sampling required is four. For a large number of rendering objects, this will cause a lot of pressure on the hardware, so reducing the number of texture sampling has become an effective way to improve the efficiency of texture storage.

Figure 1:
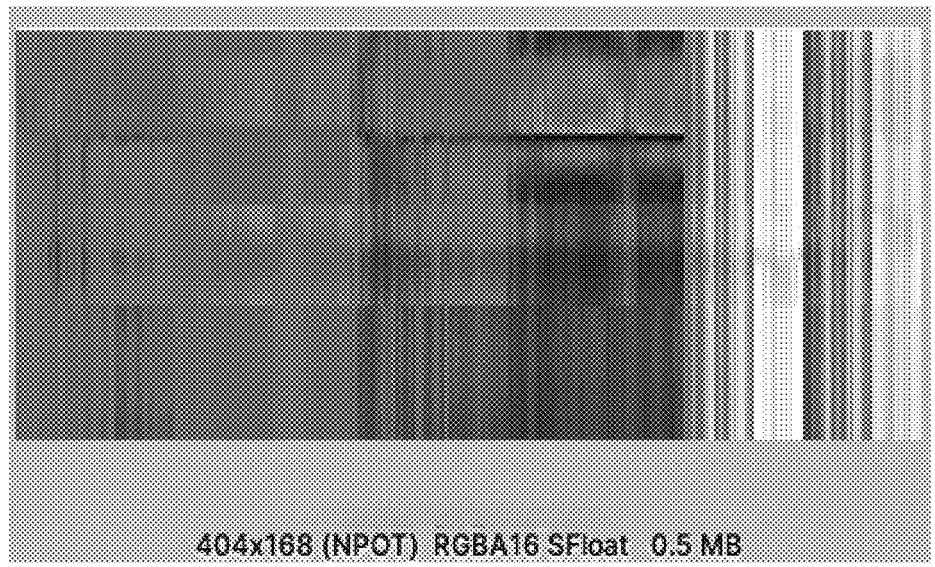
FIG. 1 is a schematic diagram showing textures storing vertex position information according to the related art.
Figure 2:
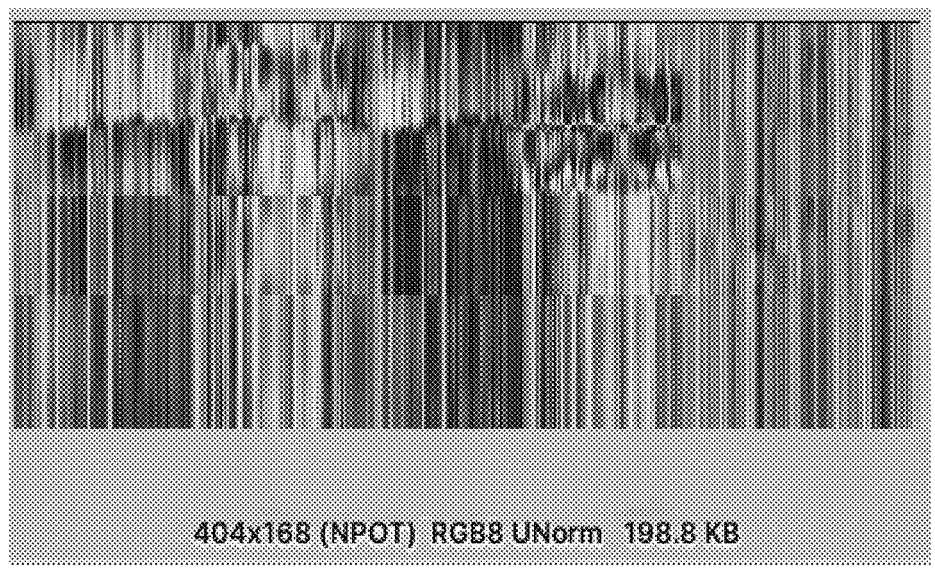
FIG. 2 is a schematic diagram showing textures storing normal information according to the related art.

Reducing of the number of texture samplings can be achieved by combining the two textures. For example, as shown in FIG. 1, the format of the texture for storing vertex position information is RGBAHalf, and a 16-bit space of the A channel is not used. As shown in FIG. 2, the format of the texture for storing normal information is RGB24, which requires a 24-bit space. One method is to compress each of the R channel data and the G channel data of the normal information into 7 bits and merge them into the A channel of the texture of the vertex position information. The B channel data of the normal information can be calculated according to the R channel data and the G channel data, for example, $b=\sqrt{1-r*r-g*g}$, where sqrt is the square root function, r is the R channel data of normal information, and g is the G channel data of normal information. In this way, the sign bit of b occupies one bit, and a total of 15 bits are required to store the normal information. In this aspect, it has been found through experiments that this sampling method for obtaining normal information will eventually lead to serious normal flickering, because there is a large waste of precision in the process of calculating b.

Figure 3:
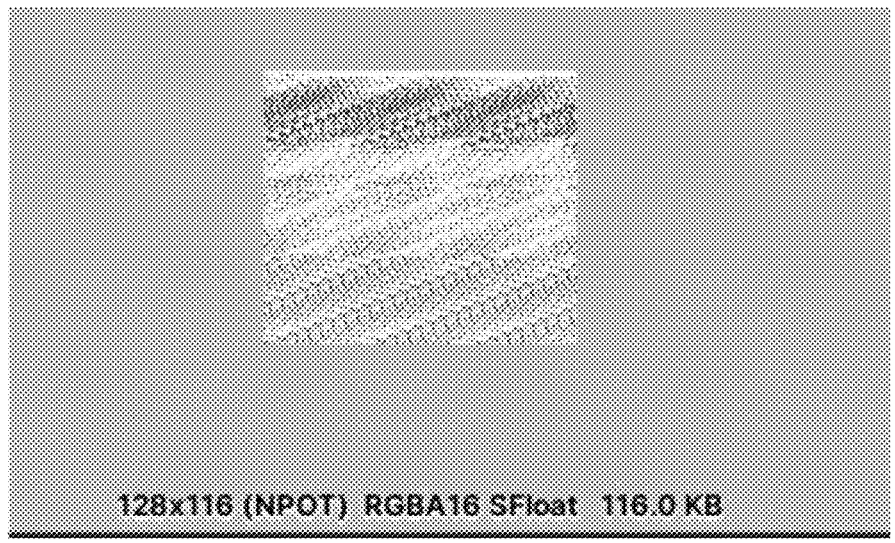
FIG. 3 is a schematic diagram showing baked textures of a skeleton matrix according to the related art.

Compared with the vertex animation mode, in the skeleton animation mode, the skeleton transformation matrix in the animation data is baked into the texture. For a 4*4 matrix of floating point type, only 3*4 data needs to be stored. Since these data each has a consistent format, as shown in FIG. 3, they can be stored in the same texture file to form baked texture of a skeleton matrix. When rendering, 3*4 data can be obtained by sampling the texture file three times, and then be assembled into a matrix. Compared with the vertex animation mode, the skeleton animation mode has the following advantages. First, the baking data is only related to the number of bones. Second, the baking data can be shared by the modes that use the same skeleton. The disadvantage is that the number of sampling times is large. If each vertex is bound with two bones, it needs to be sampling for 6 times. If there are different motion fusions, the number of sampling times is doubled to 12, which results in a lot of pressure on the hardware bandwidth during animation rendering.

For the vertex animation mode, in order to improve the above-mentioned problem of normal flickering, a method for storing the normal information is to store data of two channels with smaller values in the R, G, and B channels, and data of the other channel is obtained by calculation. The specific algorithm can be implemented by the following code:

```
void EncodeNormal (inout float3 N,  out uint Face)
{
  uint Axis = 2;
  if( abs(N.x) >= abs(N.y) && abs(N.x) >= abs(N.z) )
  {
    Axis = 0;
  }
  else if( abs(N.y) > abs(N.z) )
  {
    Axis = 1;
  }
  Face = Axis * 2;
  N = Axis == 0 ? N.yzx : N;
  N = Axis == 1 ? N.xyz : N;
  float MaxAbs =1.0 / sqrt(2.0);
  Face += N.z > 0 ? 0 : 1;
  N.xy *= N.z > 0 ? 1 : −1;
  N.xy = N.xy * (0.5 / MaxAbs) + 0.5;
}
```

However, this encoding requires additional 3 bits to store extra information, so the 16 bits of the A channel are not enough to use.

Figure 4:
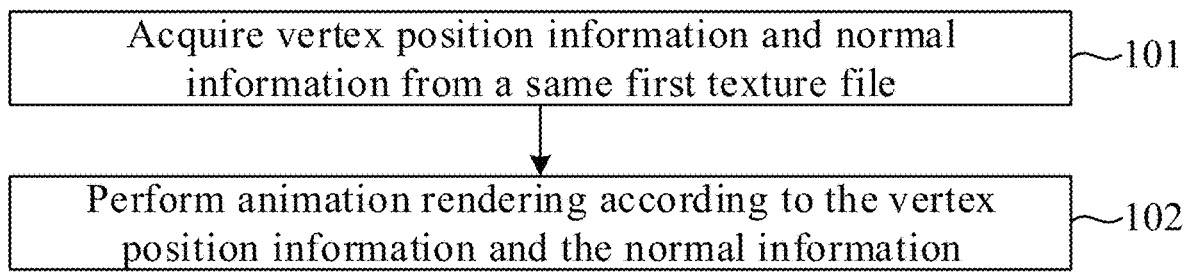
FIG. 4 is a schematic flowchart of a method for animation rendering according to an embodiment of the present disclosure.

Therefore, an embodiment of the present disclosure provides a method for animation rendering, as shown in FIG. 4, the method includes the following steps.

In a vertex animation mode, step 101 is executed, vertex position information and normal line information are acquired from a same first texture file.

The vertex position information occupies a part of an R channel, a part of a G channel and a part of a B channel, and the normal information occupies another part of the R channel, another part of the G channel, another part of the B channel, and an A channel. That is, the vertex position data of each channel in the texture for storing the vertex position information is compressed, and the remaining space after compression is used for storing the normal information. That is, the normal information is stored by bits "borrowed" from the RGB channels of the vertex position information. In addition, bits of the A channel are also used for storing normal information, so that vertex position information and normal information can be both stored in the same texture file.

In step 102, animation rendering is performed according to the vertex position information and the normal information.

In the method for animation rendering in embodiments of the present disclosure, the vertex position information and the normal information respectively occupy different parts of each of the RGB channels in the texture file, and the normal information occupies the A channel. As a result, the vertex position information and the normal information are stored in the same texture file. In this way, in the animation rendering, by sampling only one texture file, two types of information, the vertex position information and normal information, can be obtained, which is convenient for animation rendering and saves the number of sampling times in the rendering process, and thus the efficiency of storing animation data through textures is improved.

Figure 5:
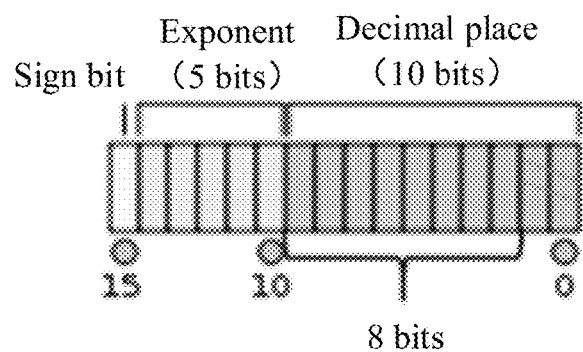
FIG. 5 is a diagram showing a structure of Half-type data according to an embodiment of the present disclosure.
Figure 6:
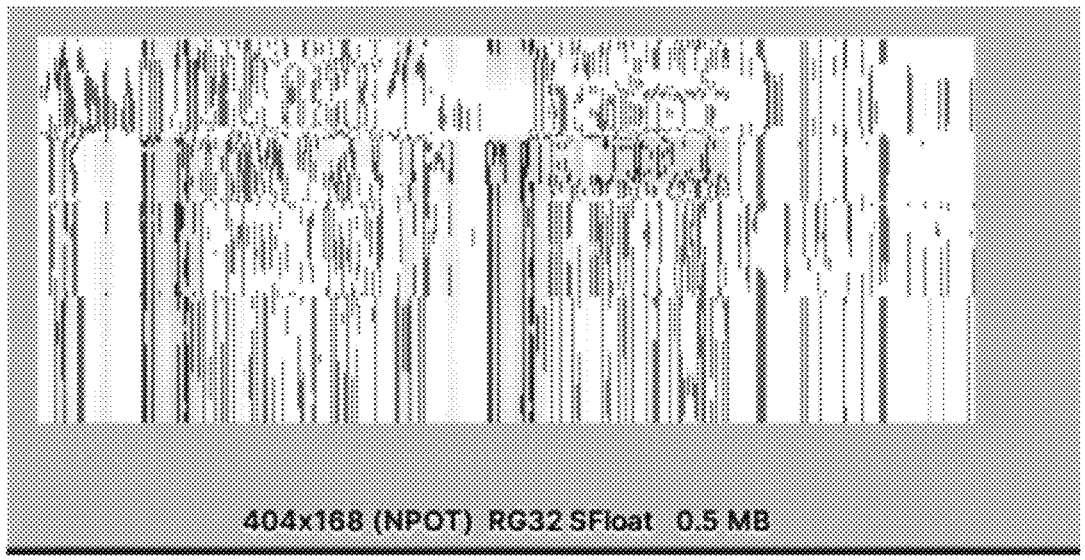
FIG. 6 is a diagram showing textures of a first texture file according to an embodiment of the present disclosure.

In one embodiment, the first texture file is in an RGBA-Half format, which has high compatibility. Data of a half-precision floating-point number Half type has a structure as shown in FIG. 5, including a 1-bit sign, a 5-bit exponent bit exponent, and a 10-bit decimal place fraction. Through testing, for the decimal place that stores the vertex position information, the precision requirement can be met by 8 bits, and 8 bits are reserved for storing the vertex position information. Therefore, the RGB channels for storing the vertex position information each provides 2 bits, plus the 16 bits of the A channel, a total of 22 bits are used for storing the normal information. As shown in FIG. 6, the normal information in R7G8B7 format can be stored by the 22 bits. The vertex position information occupies 8 bits in the decimal place of the R channel, 8 bits in the decimal place of the G channel, and 8 bits in the decimal place of the B channel. For example, the vertex position information may occupy first 8 bits in the decimal place of each of the RGB channels. The normal information occupies 2 bits in the decimal place of each of the RGB channels and 16 bits of the A channel. For example, the normal information may occupy last 2 bits in the decimal place of each of the RGB channels.

In one embodiment, the step 101 of acquiring the vertex position information and normal information from a same first texture file includes the following steps.

In step 1011, the first texture file is sampled in a shader, and first raw data is obtained.

In step 1012, decoding is performed on the first raw data, and the vertex position information and the normal information are obtained.

Since the vertex position information and the normal information are stored in the same texture file according to certain rules, the first raw data obtained by each sampling of the texture file needs to be decoded, and then the corresponding vertex position information and normal information can be assembled.

Figure 7:
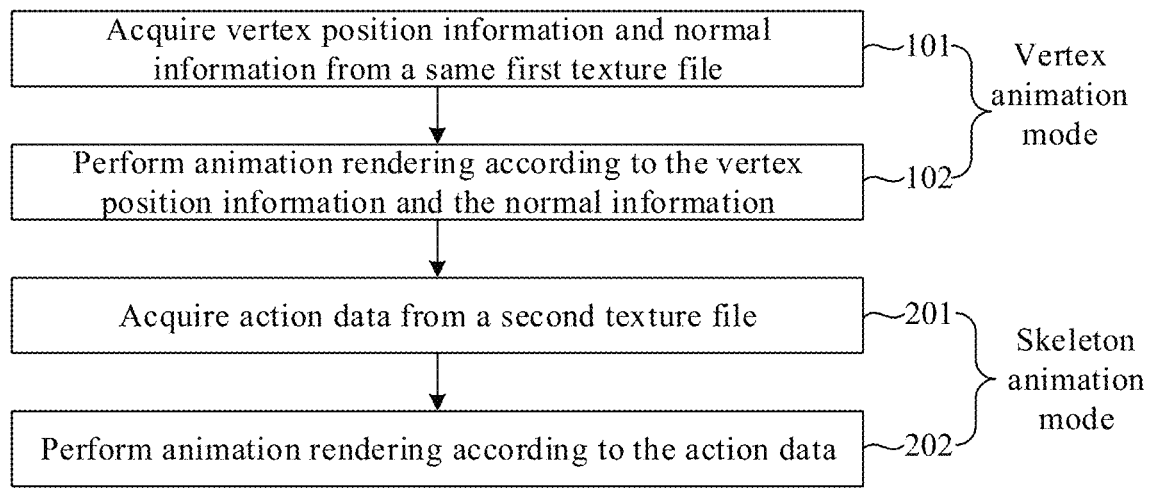
FIG. 7 is a schematic flowchart of another method for animation rendering according to an embodiment of the present disclosure.

In one embodiment, as shown in FIG. 7, the method further includes steps 201 and 202.

In a skeleton animation mode, step 201 is executed, motion data is acquired from a second texture file, the motion data includes translation data and rotation data, and the rotation data is quaternion data.

In step 202, animation rendering is performed according to the motion data.

In one embodiment, the motion data further includes scaling data.

In one embodiment, the step 201 of acquiring motion data from the second texture file includes: sampling the second texture file in a shader and obtaining second raw data; and performing decoding on the second raw data and obtaining the translation data, the rotation data, and the scaling data.

Figure 8:
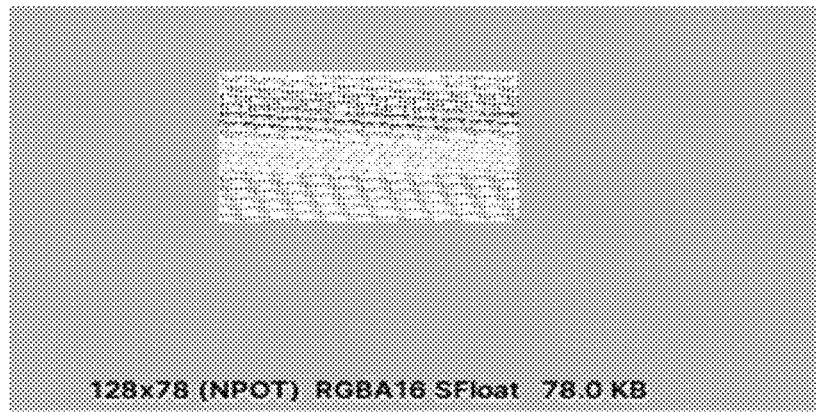
FIG. 8 is a diagram showing textures of a second texture file according to an embodiment of the present disclosure.

The motion date in the skeleton animation mode is matrix data in the second texture file. Actually, the motion data is obtained through a series of scaling, rotation and translation. Therefore, in embodiments of the present disclosure, quaternion is used for replacing the rotation data, and the translation data is reserved. Since the scaling in the skeletal animation mode is proportional scaling (for example, in SLG, if the scaling is non-proportional scaling, the color correction will be deformed when doing motion, which almost does not exist), the scaling data is represented by a floating point type data. That is, the motion data is two vector4 type data, and the motion data is stored in the second texture file as half-precision floating point number type data. The two vector4 type data are encoded to RGBAFloat type, and all data can be obtained by one sampling of the second texture file. As shown in FIG. 8, compared with FIG. 3, it can be seen that the data volume of the texture file is reduced by 33%. In addition, through the encoding of motion data, the number of texture sampling is reduced. During the animation rendering process, the number of texture sampling is changed from 6 to 2. Considering the situation of motion fusion, the number of texture sampling is changed from 12 to 4. As a result, the number of texture sampling is reduced, that is, the bandwidth pressure of the hardware during rendering is reduced.

Figure 9:
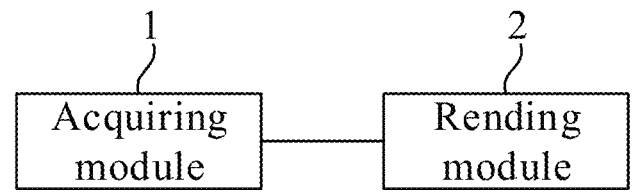
FIG. 9 is a block diagram showing a structure of an apparatus for animation rendering according to an embodiment of the present disclosure.

As shown in FIG. 9, an embodiment of the present disclosure provides an apparatus for animation rendering, including an acquiring module 1 and a rending module 2. The acquiring module is configured to acquire vertex position information and normal information from a same first texture file in a vertex animation mode. The vertex position information occupies a part of an R channel, a part of a G channel and a part of a B channel, and the normal information occupies another part of the R channel, another part of the G channel, another part of the B channel, and an A channel. The rending module 2 is configured to perform animation rendering according to the vertex position information and the normal information. The apparatus for animation rendering apparatus may implement the method for animation rendering in any of the above embodiments, and the specific process and principles are the same as those in the above embodiments, and will not be repeated here.

It should be noted that the above division of modules of the apparatus for animation rendering is merely logical function division, and during actual implementation, some or all of the modules may be integrated into one physical entity, or the modules may be physically separated. In addition, all the modules may be implemented by invoking software by a processing element; or all the modules may be implemented by hardware; or some modules may be implemented by invoking software by a processing element, and some modules may be implemented by hardware. For example, at least one of the acquiring module 1 or the rending module 2 may be an independently disposed processing element, or may be integrated into a chip of the apparatus for animation rendering for implementation. In addition, at least one of the acquiring module 1 or the rending module 2 may alternatively be stored in a memory of the apparatus for animation rendering in a form of program code, and is invoked by a processing element of the apparatus for animation rendering, to execute the foregoing functions of the acquiring module 1 and/or the rending module 2. Implementation of other modules is similar to that of the scheduling module. In addition, all or some of the modules may be integrated, or may be implemented independently. Herein, the processing element may be an integrated circuit with a signal processing capability. During implementation, the operations of the foregoing methods or the foregoing modules may be implemented by using an integrated logic circuit of hardware in the processor element, or by using a software instruction. In addition, the above apparatus for animation rendering may be the same apparatus, or may be different apparatuses.

For example, the apparatus for animation rendering may be one or more integrated circuits configured to implement the above method. For example, the apparatus for animation rendering may be: one or more Application Specific Integrated Circuit (ASIC), or one or more microcontroller unit (MCU), or one or more digital signal processor (DSP), or one or more Field Programmable Gate Array (FPGA), etc. For another example, when one of the above modules is implemented in the form of program scheduling by a processing unit, the processing unit may be a general-purpose processor, such as a central processing unit (CPU) or other processors that can invoke programs. For another example, these modules can be integrated together and implemented in the form of a system-on-a-chip (SOC).

In one embodiment, the first texture file is in an RGBA-Half format; the vertex position information occupies 8 bits in a decimal place of the R channel, 8 bits in a decimal place of the G channel, and 8 bits in a decimal place of the B channel. The normal information occupies 2 bits in the decimal place of the R channel, 2 bits in the decimal place of the G channel, 2 bits in the decimal place of the B channel, and 16 bits of the A channel.

In one embodiment, the process of acquiring the vertex position information and normal information from a same first texture file includes: sampling the first texture file in a shader and obtaining first raw data; and performing decoding on the first raw data and obtaining the vertex position information and normal information.

In one embodiment, the acquiring module 1 is further configured to: in a skeleton animation mode, acquire motion data from a second texture file, the motion data includes translation data and rotation data, and the rotation data is quaternion data. The rending module 2 is configured to perform animation rendering according to the motion data.

In one embodiment, the motion data further includes scaling data.

In one embodiment, the acquiring motion data from the second texture file includes the following steps.

The second texture file is sampled in a shader, and second raw data is obtained. Decoding is performed on the second raw data, and the translation data, the rotation data, and the scaling data are obtained.

Figure 10:
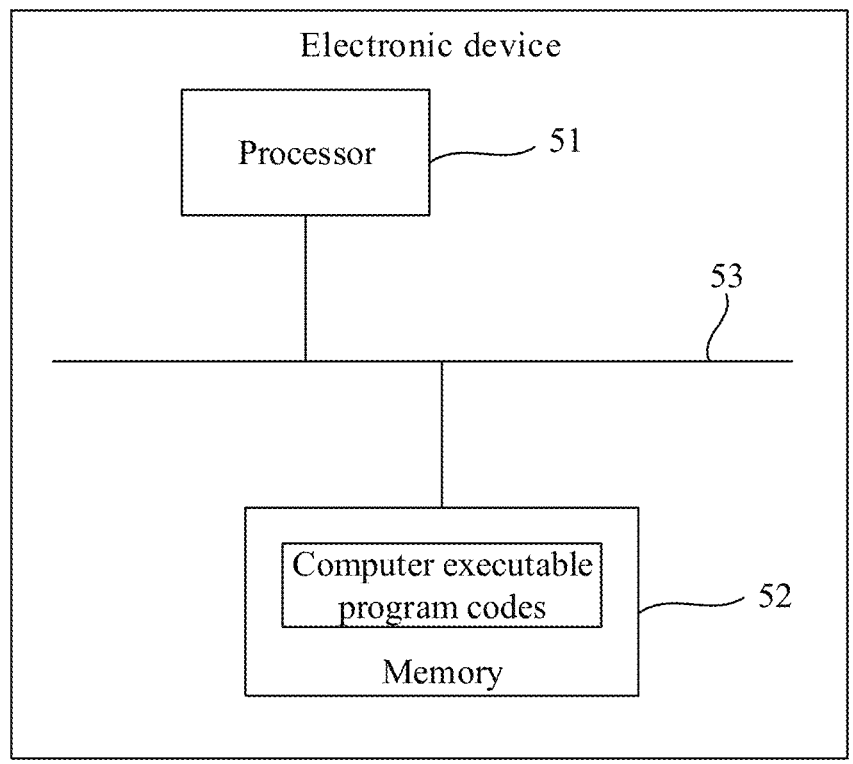
FIG. 10 is a block diagram showing a structure of an electronic device according to an embodiment of the present disclosure.

As shown in FIG. 10, an embodiment of the present disclosure further provides an electronic device including a processor 51 and a memory 52. The memory 52 is configured to store at least one piece of instruction. The instruction is loaded and executed by the processor 51 to implement the method for animation rendering in any of the above embodiments. The specific process and principle of the method for animation rendering are the same as those in the above embodiment, and are not repeated here.

The number of the processor 51 may be one or more, and the processor 51 and the memory 52 may be connected through a bus 53 or other means. As a non-transitory computer-readable storage medium, the memory 52 can be used for storing non-transitory software programs, non-transitory computer-executable programs and modules, such as program instructions/modules corresponding to the apparatus for animation rendering in the embodiments of the present disclosure. The processor executes various functional applications and data processing by running the non-transitory software programs, instructions and modules stored in the memory, that is, to implement the method in any of the above method embodiments. The memory may include a program storing area and a data storing area. The program storing area may store an operating system, an application program required for at least one function; and necessary data and the like. Additionally, the memory may include high-speed random access memory, and may also include non-transitory memory, such as at least one magnetic disk storage device, flash memory device, or other non-transitory solid state storage device. The electronic device can be, for example, electronic products such as servers, computers, mobile phones, etc.

An embodiment of the present disclosure further provides a non-transitory storage medium. The non-transitory storage medium stores computer programs. When executed on a computer, the computer programs cause the computer to perform the method for animation rendering in any of the above embodiments.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, the procedure or functions according to the embodiments of the present invention are all or partially generated. The computer may be a general-purpose computer, a dedicated computer, a computer network, or other programmable apparatuses. The computer instructions may be stored in a non-transitory storage medium or may be transmitted from one non-transitory storage medium to another non-transitory storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, DVD), a semiconductor medium (for example, a Solid State Disk (SSD)), or the like.

An embodiment of the present disclosure further provides a computer program product. The computer program product includes executable instructions. When executed by a computer, the executable instructions cause the computer to perform the method for animation rendering in any of the above embodiments.

In the embodiments of this disclosure, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. Herein, A and B may be in the singular or in the plural. The character "/" usually indicates an "or" relationship between the associated objects. "At least one of the following items" and similar expressions mean any combination of the items, including any combination of a single item or a plurality of items. For example, at least one of a, b, and c may represent a, b, c, a–b, a–c, b–c, or a–b–c. Herein, a, b, and c may be in the singular or in the plural.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for animation rendering, comprising:
in a vertex animation mode, acquiring vertex position information and normal information from a same first texture file, wherein the vertex position information occupies a part of an R channel, a part of a G channel and a part of a B channel, and the normal information occupies another part of the R channel, another part of the G channel, another part of the B channel, and an A channel; and
performing animation rendering according to the vertex position information and the normal information.

2. The method for animation rendering according to claim 1, wherein the first texture file is in an RGBAHalf format, the vertex position information occupies 8 bits in a decimal place of each of the R channel, the G channel and the B channel, and the normal information occupies 2 bits in a decimal place of each of the R channel, the G channel, the B channel and 16 bits of the A channel.

3. The method for animation rendering according to claim 2, wherein the acquiring the vertex position information and normal information from a same first texture file comprises:
sampling the first texture file in a shader and obtaining first raw data; and
decoding the first raw data and obtaining the vertex position information and normal information.

4. The method for animation rendering according to claim 1, further comprising:
in a skeleton animation mode, acquiring motion data form a second texture file, wherein the motion data comprises translation data and rotation data of quaternion; and
performing animation rendering according to the motion data.

5. The method for animation rendering according to claim 4, wherein the motion data further comprises scaling data.

6. The method for animation rendering according to claim 5, wherein the acquiring motion data from the second texture file comprises:
sampling the second texture file in a shader and obtaining second raw data; and
decoding the second raw data and obtaining the translation data, the rotation data, and the scaling data.

7. An electronic device, comprising:
at least one processor; and
a memory coupled to the at least one processor and storing programmable instructions, wherein when executed by the at least one processor, the programmable instructions cause the at least one processor to:
acquire vertex position information and normal information from a same first texture file in a vertex animation mode, wherein the vertex position information occupies a part of an R channel, a part of a G channel and a part of a B channel, and the normal information occupies another part of the R channel, another part of the G channel, another part of the B channel, and an A channel; and
perform animation rendering according to the vertex position information and the normal information.

8. The electronic device according to claim 7, wherein the first texture file is in an RGBAHalf format, the vertex position information occupies 8 bits in a decimal place of each of the R channel, the G channel and the B channel, and the normal information occupies 2 bits in a decimal place of each of the R channel, the G channel, the B channel and 16 bits of the A channel.

9. The electronic device according to claim 8, wherein the at least one processor is configured to:
sample the first texture file in a shader and obtain first raw data; and
decode the first raw data and obtain the vertex position information and normal information.

10. The electronic device according to claim 7, wherein the at least one processor is further configured to:
in a skeleton animation mode, acquire motion data form a second texture file, wherein the motion data comprises translation data and rotation data of quaternion; and
perform animation rendering according to the motion data.

11. The electronic device according to claim 10, wherein the motion data further comprises scaling data.

12. The electronic device according to claim 11, wherein the at least one processor is configured to:
sample the second texture file in a shader and obtain second raw data; and
decode the second raw data and obtain the translation data, the rotation data, and the scaling data.

13. A non-transitory storage medium comprising programs stored thereon, wherein when being executed, the programs cause a device where the non-transitory storage medium is located to:
acquire vertex position information and normal information from a same first texture file in a vertex animation mode, wherein the vertex position information occupies a part of an R channel, a part of a G channel and a part of a B channel, and the normal information occupies another part of the R channel, another part of the G channel, another part of the B channel, and an A channel; and
perform animation rendering according to the vertex position information and the normal information.

14. The non-transitory storage medium according to claim 13, wherein the first texture file is in an RGBAHalf format, the vertex position information occupies 8 bits in a decimal place of each of the R channel, the G channel and the B channel, and the normal information occupies 2 bits in a decimal place of each of the R channel, the G channel, the B channel and 16 bits of the A channel.

15. The non-transitory storage medium according to claim 14, wherein the programs further cause the device to:

sample the first texture file in a shader and obtain first raw data; and decode the first raw data and obtain the vertex position information and normal information.

16. The non-transitory storage medium according to claim 13, wherein the programs further cause the device to:

in a skeleton animation mode, acquire motion data form a second texture file, wherein the motion data comprises translation data and rotation data of quaternion; and perform animation rendering according to the motion data.

17. The non-transitory storage medium according to claim 16, wherein the motion data further comprises scaling data.

18. The non-transitory storage medium according to claim 17, wherein the programs further cause the device to:

sample the second texture file in a shader and obtain second raw data; and decode the second raw data and obtain the translation data, the rotation data, and the scaling data.

* * * * *